US007620975B2

(12) United States Patent
Guichard et al.

(10) Patent No.: US 7,620,975 B2
(45) Date of Patent: Nov. 17, 2009

(54) INTERNAL ROUTING PROTOCOL SUPPORT FOR DISTRIBUTING ENCRYPTION INFORMATION

(75) Inventors: James N. Guichard, Groton, MA (US); W. Scott Wainner, Potomac Falls, VA (US); Brian E. Weis, San Jose, CA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 11/059,736

(22) Filed: Feb. 17, 2005

(65) Prior Publication Data

US 2006/0184999 A1 Aug. 17, 2006

(51) Int. Cl.
G06F 7/04 (2006.01)
G06F 15/16 (2006.01)
G06F 17/30 (2006.01)
H04F 29/06 (2006.01)

(52) U.S. Cl. .......................................... 726/3; 380/200
(58) Field of Classification Search ................. 370/392, 370/219; 709/229; 726/3, 6; 380/200
See application file for complete search history.

(56) References Cited

U.S. PATENT DOCUMENTS

| | | | | |
|---|---|---|---|---|
| 6,526,056 B1 * | 2/2003 | Rekhter et al. | ............. | 370/392 |
| 6,970,464 B2 * | 11/2005 | Xu et al. | .................... | 370/392 |
| 6,976,177 B2 * | 12/2005 | Ahonen | ........................ | 726/3 |
| 7,028,334 B2 * | 4/2006 | Tuomenoksa | .................. | 726/3 |
| 7,047,303 B2 * | 5/2006 | Lingafelt et al. | ............ | 709/229 |
| 7,143,289 B2 * | 11/2006 | Denning et al. | ............. | 713/168 |
| 7,150,037 B2 * | 12/2006 | Wolf et al. | ...................... | 726/6 |
| 7,164,679 B2 * | 1/2007 | Kotha et al. | ................. | 370/392 |
| 7,233,593 B2 * | 6/2007 | Chavali | ...................... | 370/392 |
| 7,277,383 B2 * | 10/2007 | Choe et al. | ................... | 370/219 |
| 7,330,469 B2 * | 2/2008 | Ko et al. | ..................... | 370/392 |
| 7,362,752 B1 * | 4/2008 | Kastenholz | ................. | 370/389 |
| 2003/0081589 A1 * | 5/2003 | Marian et al. | ............... | 370/351 |
| 2004/0091117 A1 * | 5/2004 | Narayanan | ...................... | 726/3 |
| 2004/0105442 A1 * | 6/2004 | Ko et al. | ..................... | 370/392 |

OTHER PUBLICATIONS

Bradley R. Smith; Securing the Border Gateway Routing Protocol; Year 1996; University of California; p. 1-5.*

* cited by examiner

*Primary Examiner*—Kambiz Zand
*Assistant Examiner*—Monjour Rahim
(74) *Attorney, Agent, or Firm*—BainwoodHuang

(57) ABSTRACT

A method and apparatus for providing routing protocol support for distributing encryption information is presented. Subnet prefixes reachable on a first customer site in an encrypted manner are identified, as are security groups the subnet prefixes belong to. An advertisement is received at a first Customer Edge (CE) device in the first customer site, the advertisement originating from a Customer (C) device in the first customer site. The advertisement indicates links, subnets to be encrypted, and security group identifiers. The prefixes and the security group identifiers are then propagated across a service provider network to a second CE device located in a second customer site. In such a manner, encryption and authentication is expanded further into a customer site, as customer devices are able to indicate to a service provider network infrastructure and other customer devices in other customer sites which local destinations require encryption/authentication.

25 Claims, 7 Drawing Sheets

INTERNAL ROUTING PROTOCOL SUPPORT FOR DISTRIBUTING ENCRYPTION INFORMATION

BACKGROUND

Cryptography is used to make it difficult for an unauthorized third party to access and understand private communication between two parties. Private data can be made unintelligible to unauthorized parties through the process of encryption. Encryption uses complex algorithms to convert the original message, or cleartext, to an encoded message, called ciphertext. One version of encryption is known as Internet Protocol Security (IPsec). IPsec provides per-packet authenticity/confidentiality guarantees between peers. A further use of this technology is known as Dynamic Group Virtual Private Network (DGVPN) which provides the ability to enable group-wide Internet Protocol Security (IPsec) security in a network environment. In DGVPN, a Customer Edge (CE) router advertises information to a PE-router indicating that encryption/authentication services are required for a given subnet prefix. This information is then distributed using an External Gateway Protocol (EGP). DGVPN is described in detail in co-pending U.S. patent application Ser. No. 10/649,755, filed Aug. 26, 2003, entitled "Method and Apparatus to Distribute Policy Information", and co-pending U.S. patent application Ser. No. 10/867,266 filed Jun. 14, 2004 entitled "System and Method for Dynamic Secured Group Communication", the disclosures of which are incorporated by reference in their entirety.

SUMMARY

Conventional mechanisms such as those explained above suffer from a variety of deficiencies. One such deficiency is that conventional DGVPN runs from CE router to CE router and therefore has no means for distribution of encryption/authentication requirements when using an Interior Gateway Protocol (IGP), either on the PE-CE links or to devices within an attached customer site.

Embodiments of the invention significantly overcome such deficiencies and provide mechanisms and techniques that provide routing protocol support for distributing encryption information across a service provider network from a customer site to another customer site, such that encryption can be used from a device in one customer site, across the service provider network, to another device in a second customer site.

In a particular embodiment of a method for providing routing protocol support for distributing encryption information, the method includes identifying subnet prefixes reachable on a first customer site. Also identified are security groups the subnet prefixes belong to. An advertisement is received at a first Customer Edge (CE) device in the first customer site, the advertisement originating from a Customer (C) device in the first customer site. The advertisement indicates links, subnets to be encrypted, and security group identifiers. The prefixes and the security group identifiers are then propagated across a service provider network to other CE devices located in one or more customer sites.

Other embodiments include a method of providing routing protocol support for distributing encryption information wherein a message indicating subnet prefixes within a first customer site that are to be encrypted and security group identifiers indicating security groups within the first customer site are received at a second CE device located in a second customer site. The message received at the first Customer Edge (CE) at the first customer site is transferred via the service provider network to the second CE device. The subnet prefixes and said security group identifiers are then advertised to other devices in the second customer site.

Still other embodiments include a method of providing routing protocol support for distributing encryption information wherein a message indicating subnet prefixes within a first customer site that are to be encrypted and security group identifiers indicating security groups within the first customer site are received at a service provider network from a first Customer Edge (CE) device in a first customer site. The message indicating the subnet prefixes and the security group identifiers is propagated to a second CE device in a second customer site.

Other embodiments include a computer readable medium having computer readable code thereon for providing IGP routing protocol support for distributing encryption information. The medium includes instructions for identifying subnet prefixes reachable on a first customer site and instructions for identifying security groups the subnet prefixes belong to with security group identifiers. The medium also includes instructions for receiving, at a first Customer Edge (CE) device in the first customer site, an advertisement from a Customer (C) device in the first customer site indicating links, the subnets to be encrypted, and the security group identifiers, the advertisement performed using a first routing mechanism. The medium further includes instructions for propagating the prefixes and the security group identifiers across a service provider network to a second CE device located in a second customer site, the instructions for propagating including instructions for converting the advertisement to a message associated with a second routing mechanism. The medium may also include instructions for advertising the subnet prefixes and the security group identifiers to other devices in the second customer site, the instructions for advertising including instructions for converting the message associated with a second mechanism to an advertisement associated with the first routing mechanism.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an attribute history as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an attribute level change history as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method is described wherein the concept of encryption and authentication is expanded further into a customer site as customer devices are able to indicate to a service provider network infrastructure and other customer devices in other customer sites which local destinations require encryption/authentication.

Figure 1:
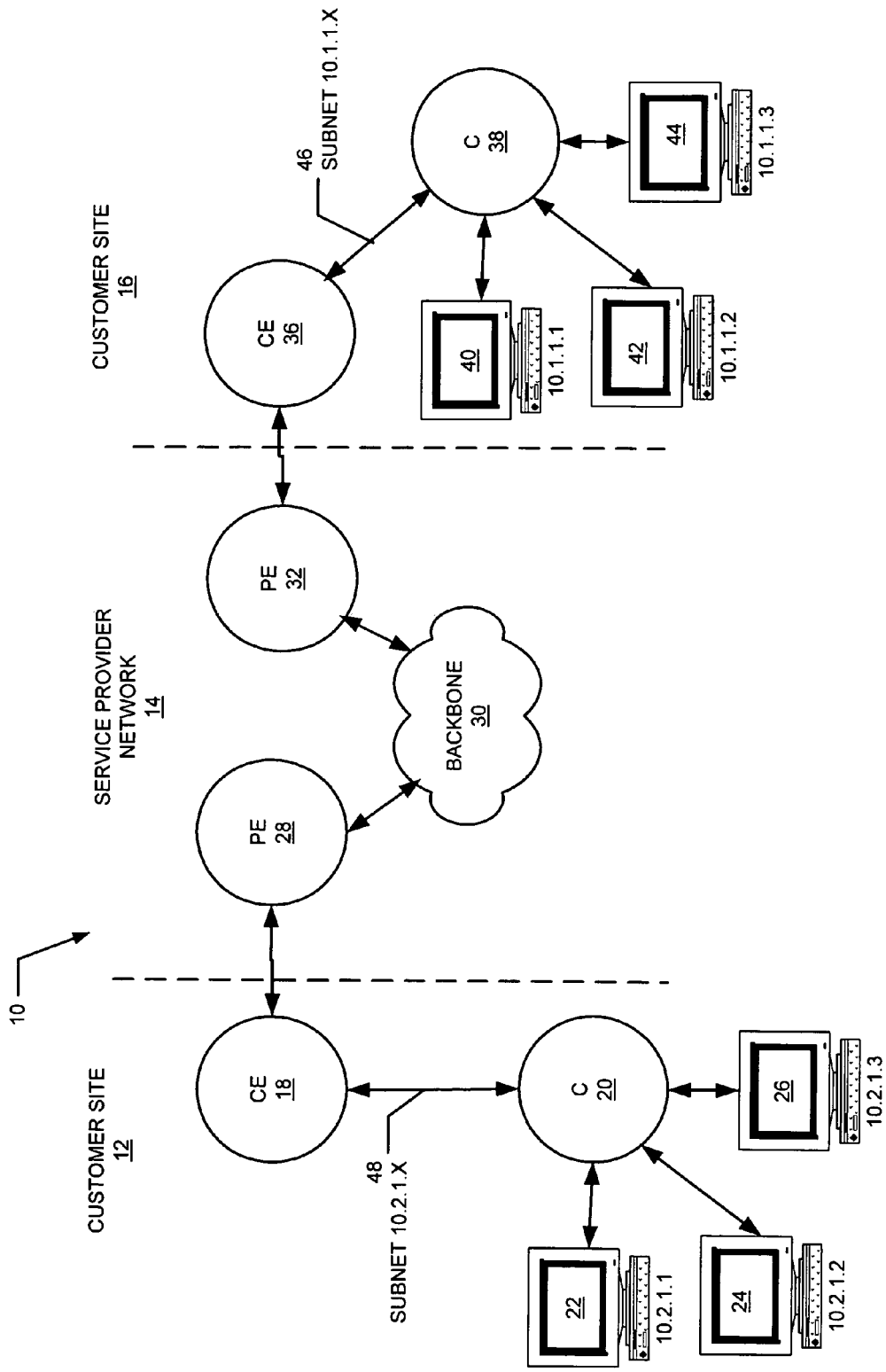
FIG. 1 is a block diagram of an environment for providing routing protocol support for distributing encryption information in accordance with embodiments of the invention.

Referring now to FIG. 1, an environment 10 for providing IGP routing protocol support for distributing encryption information is shown. The environment 10 includes a first Customer site 12 coupled to a Service Provider Network 14. A second customer site 16 is shown coupled to the service provider network 14.

The customer site 12 includes a Customer Edge (CE) router 18. CE router 18 is coupled to a customer C router 20. The C router 20 is shown coupled to customer premises equipment 22, 24, and 26.

The service provider network 14 includes a first Provider Edge (PE) router 28 which is coupled to CE router 18 of customer site 12. The Service Provider network 14 also includes a second PE router 32 which is coupled to the CE router 36 of the customer site 16. Within the Service Provider network 14, each PE router 28 and 32 is coupled to a backbone 30. The customer sites 12 and 16 utilize a first routing mechanism such as an Internal Gateway Protocol (IGP). Examples of IGPs include Open Shortest Path First (OSPF), Enhanced Interior Gateway Routing Protocol (EIGRP) and Routing Information Protocol (RIP). The Service Provider Network 14 uses a different routing mechanism than the ones used by the customer sites 12 and 16. The Service Provider Networks may use an Exterior Gateway Protocol (EGP) such as Border Gateway Protocol (BGP).

Prior mechanisms, such as DGVPN, provide for encryption from CE 18 across the service provider network through PE 28, through backbone 30, PE 32 to CE 36. By way of the present invention the encryption is extended into the customer sites such that encrypted packets can travel from C router 20 to CE 18, PE 28, backbone 30, PE 32, CE 36 and C 38. The encryption messages received by CE 18 from C 20 in the first routing protocol may be converted into the appropriate messages for the second routing mechanism used between CE 18 and PE 28. Alternatively, the message received by CE 18 from C 20 may be relayed using the first routing protocol to the PE 28. For encryption messages relayed by the CE or originated in the CE using the first routing protocol, the encryption messages will be converted at the PE 28 into the second routing protocol for transportation across the service provider network 14 to PE 32. At this point the messages in the second routing mechanism protocol may then be converted by PE 32 back to the first routing mechanism protocol for transmission to CE 36 and subsequently to C 38. Alternatively, encryption messages received by PE 32 from PE 28 using the second routing protocol may be relayed by PE 32 to CE 36 where CE 36 will convert the encryption messages back into the first routing protocol. CE 36 may then relay the encryption messages using the first routing protocol to C 38. This extends the encryption path from C 20 to C 38.

The encryption information is distributed by identifying subnet prefixes reachable on a first customer site and by identifying, with security group identifiers, security groups the subnet prefixes belong to. The first Customer Edge (CE) device in the first customer site receives an advertisement from a Customer (C) device in the first customer site indicating links, the subnets to be encrypted, and the security group identifiers. The CE device propagates the prefixes and the security group identifiers across a service provider network to a second CE device located in a second customer site.

The receipt of an advertisement from a C device in the first customer site is done using a first routing mechanism (e.g. OSPF) and the propagating of the prefixes and the security group identifiers across the service provider network is done using a second routing mechanism (e.g., BGP). As a result, the advertisement is converted from an advertisement associated with the first routing mechanism to an advertisement associated with the second routing mechanism.

Once the routing control plane has been established, encrypted packets may be transmitted from the first C device to a second C device, from the first C device to a second CE device, or from a first CE device to the second C device. Alternatively, encrypted packets can be received at the first CE device from the first C device, the encrypted packets are encrypted again (doubly encrypted). The doubly encrypted packets are received at the second CE device where they are unencrypted once resulting in singly encrypted packets. These encrypted packets are then received at the second C device.

In a particular configuration discussed herein, the first customer site 12 is realized as a Local Area Network (LAN) as is the second customer site 16. Both of the LANs are running the OSPF routing protocol. The service provider network 14 is running BGP and this includes the PE-CE links. Group IDs are used to identify the parameters to use when encrypting/decrypting traffic to/from customer edge routers, which are devices operable to protect a particular subnet, identified by a subnet prefix. The subnet prefix identifies the subrange of addresses to which encryption should be applied to packets when forwarded toward the said subnet. Group members, therefore, collectively include the customer routers that will apply the encryption and have access to the DGVPN mechanisms that distributed the encryption policy parameters. Since an outgoing communication emanates from within the subnet protected by the CE router, the communication is known to emanate from the group corresponding to the CE router. The CE router identifies a communication as belonging to a group when the packet of such a communication is within one of the address prefixes, or subranges, of the group. The gateway router then employs the group key corresponding to the group ID for encrypting the communication before sending the communication to the remote CE router protecting the customer site subnet.

CE router 18 is operable to control access to a subnet including a plurality of customer hosts 22, 24 and 26. CE 18 includes routing information such as associations, indicative of group IDs as well as corresponding address subranges (address prefixes), and may represent a single source path to the customer hosts 22, 24, and 26, or may be one of a plurality of paths. Similarly, CE 18 may support only the subnet range, or may support other customer hosts not in the subrange, and hence, not included in a group corresponding to the subrange. A similar arrangement also exists for CE router 36 which is operable to control access to a subnet including a plurality of customer hosts 40, 42 and 44.

A first subnet 46 corresponds to prefix 10.1.1.0/24, for the subrange 10.1.1.1 through 10.1.1.254 including customer hosts 40, 42 and 44. Similarly, a second subnet 48 corresponds to prefix 10.2.1.0/24, for the subrange 10.2.1.1 through 10.2.1.254 including customer hosts 22, 24 and 26, all collectively forming a group.

In such an environment 10, a customer host 40 on subnet 46 is operable to send a message to a customer host 26 using encryption between CE 36 and CE 18, because each subnet 46 and 48 is a member of the group and served by the respective router PE 32 and PE 28 having the group routing information in the routing table.

In order for the encryption/authentication process to function, the information relating to the encryption/authentication must be converted from OSPF in customer site 12, to BGP in Service Provider Network 14, then back to OSPF in customer site 16.

In a particular example, the following mechanisms are used to provide the communication of the encryption/authentication information.

For CE to PE peer mode operation with OSPF, a router informational Link State Advertisement (LSA) with Opaque type of 4 and Opaque ID of 0 is used. The format of this LSA is as follows:

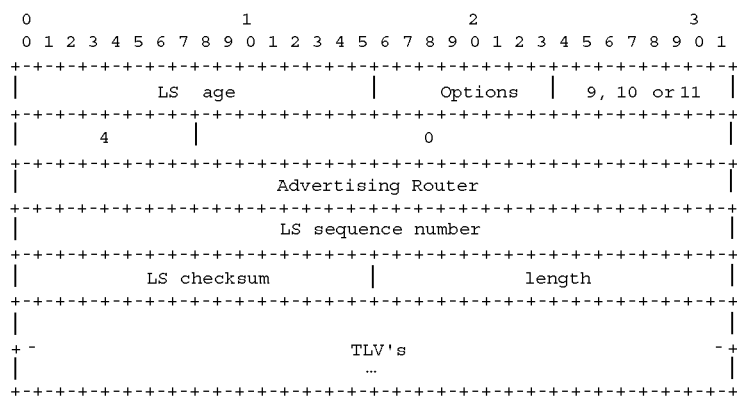

For DGVPN CE-PE peer mode operation this LSA type is used for advertisement of encryption/decryption requirements from a C-router/CE-router.

OSPF is also used for signaling Tunnel endpoint information and utilizes an OSPF IPv4 tunnel capability Type Length Value (TLV) that is carried within the OSPF router information LSA. The format of this TLV is as follows:

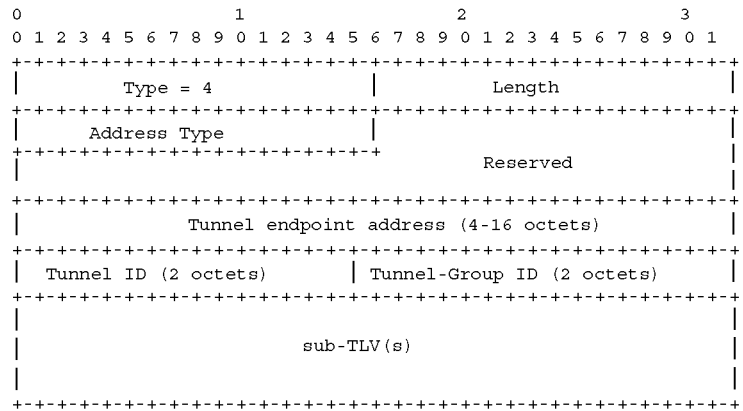

For DGVPN peer mode operation it is necessary to advertise the IPSec endpoint address and this will be carried within the "Tunnel Endpoint Address" field of the OSPF IPv4 Tunnel capability TLV. The Tunnel ID and Tunnel-Group ID are set to NULL. The Security Gateway Identifier (SGI) information is carried within a sub-TLV as follows:

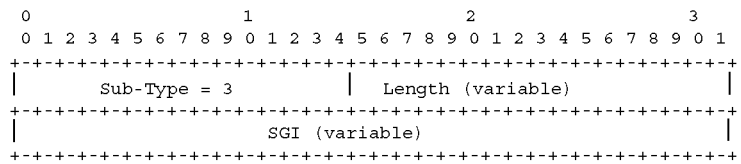

For DGVPN peer mode operation with Group Domain of Interpretation (GDOI) group key derivation, it is necessary to advertise the IPSec group identity (GID) as well as the IPSec endpoint address. The GID information is carried within a sub-TLV as follows:

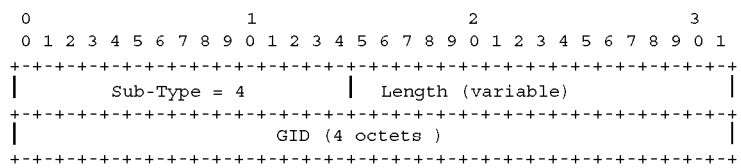

As described for the Peer mode operation, [INFO-LSA] defines the router information LSA with Opaque type of 4 and Opaque ID of 0 for CE to PE group mode operation with OSPF. The format of this LSA is as previously described. For DGVPN group mode operation with group key derivation, it is only necessary to advertise the IPSec group identity (GID). The GID information is carried using a sub-TLV within the router information LSA as follows:

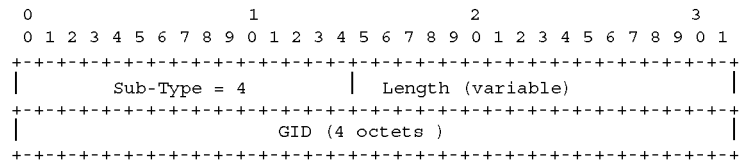

Regardless of which mode of operation is used, a further TLV is used so as to indicate which prefixes require encryption. This sub-TLV is of the following format and may carry multiple prefix/prefix mask entries:

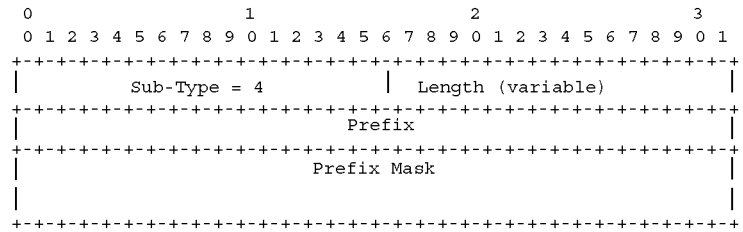

While the above example has been described using OSPF as the first routing mechanism and BGP as the second routing mechanism, it should be appreciated the concepts are applicable to other routing mechanism as well, and should not be limited to only OSPF and BGP.

Flow charts of particular embodiments of the presently disclosed methods are depicted in FIGS. 2A through 4. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 2A:
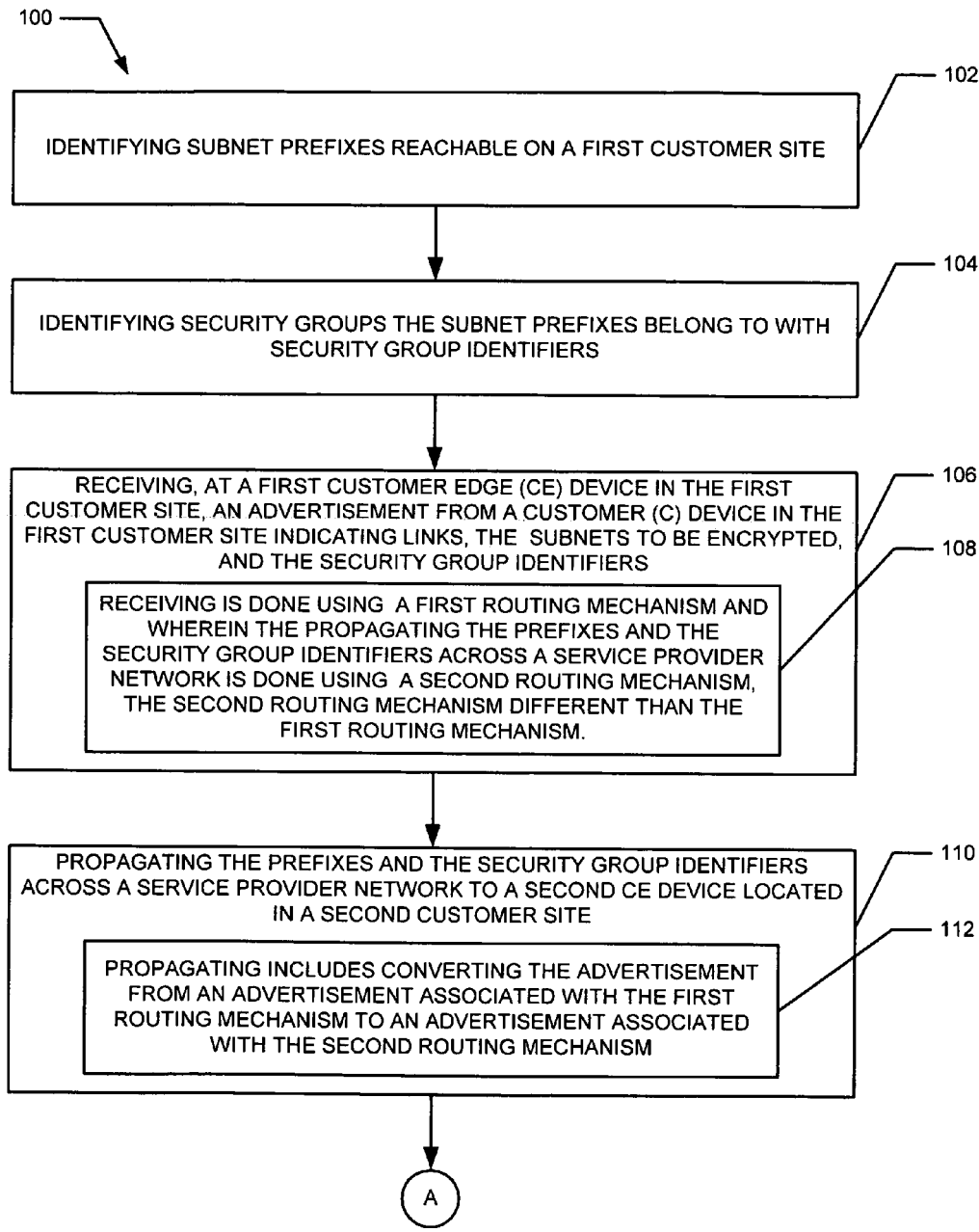
FIGS. 2A and 2B are flow diagrams for a particular embodiment of a method of providing IGP routing protocol support for distributing encryption information.
Figure 2B:
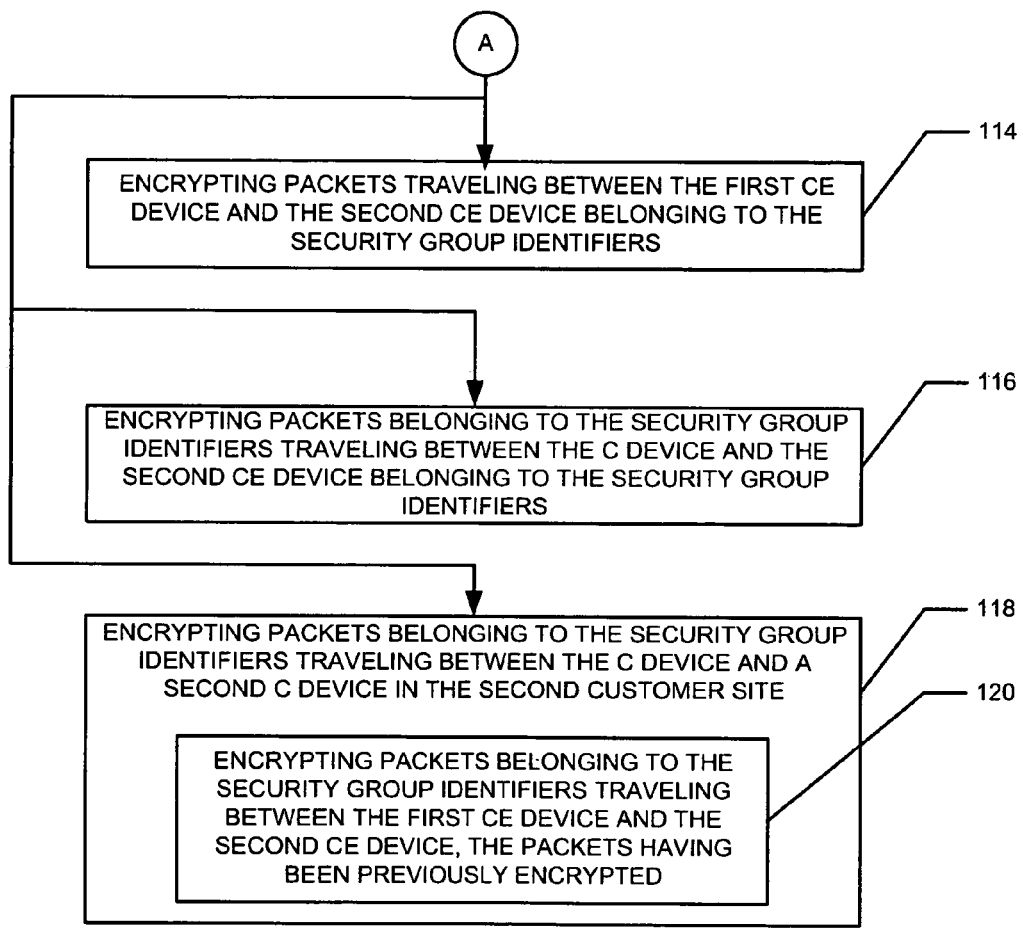

Referring now to FIGS. 2A and 2B, a particular embodiment of a method 100 of providing IGP routing protocol support for distributing encryption information is shown. The method 100 begins with processing block 102 wherein subnet prefixes reachable on a first customer site are identified.

In processing block 104 the security groups the subnet prefixes belong to are identified. Security group identifiers are used to identify the security groups.

In processing block 106, an advertisement is received from a Customer (C) device in a first customer site by a CE device. The advertisement indicates information regarding links, subnets to be encrypted, and the security group identifiers.

In processing block 108, the receipt of the advertisement described in processing block 106 is done using a first routing mechanism. The propagating of the prefixes and the security group identifiers across a service provider network is done using a second routing mechanism, the second routing mechanism being different than the first routing mechanism.

In processing block 110, the prefixes and the security group identifiers are propagated across a service provider network to a second CE device located in a second customer site. In processing block 112 the propagating includes converting the advertisement from an advertisement associated with the first routing mechanism to an advertisement associated with the second routing mechanism.

Referring now to processing block 114, the packets traveling between the first CE device and the second CE device which belong to the security group identifiers are encrypted.

Alternately, as shown in processing block 116, the packets traveling between the C device and the second CE device which belong to the security group identifiers are encrypted.

In another alternate method, in processing block 118, the packets traveling between the first C device and the second C device which belong to the security group identifiers are encrypted. This may include, as shown in processing block 120, encrypting packets at a CE device which have already been encrypted. The packets from the first C device are encrypted before being transported to the first CE device. The first CE device then encrypts the previously encrypted packets (double encryption) before sending the doubly encrypted packets across the Service Provider network. The doubly encrypted packets are received at the second CE and are unencrypted once, resulting in single encrypted packets. The single encrypted packets are forwarded to the second C device, where the packets are then unencrypted before being forwarded to the appropriate customer device.

Figure 3A:
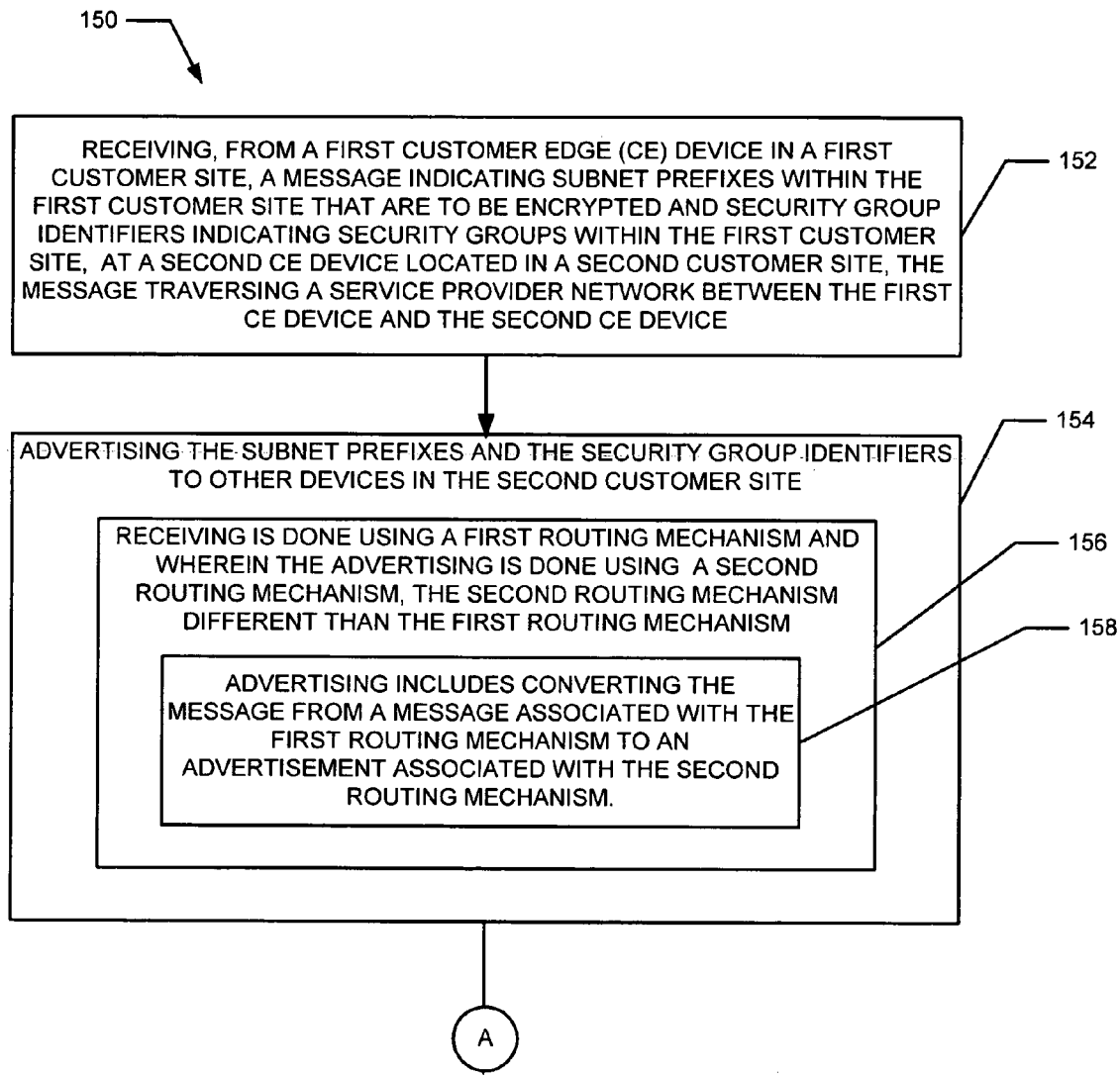
FIGS. 3A and 3B are flow diagrams for another particular embodiment of a method of providing IGP routing protocol support for distributing encryption information.
Figure 3B:
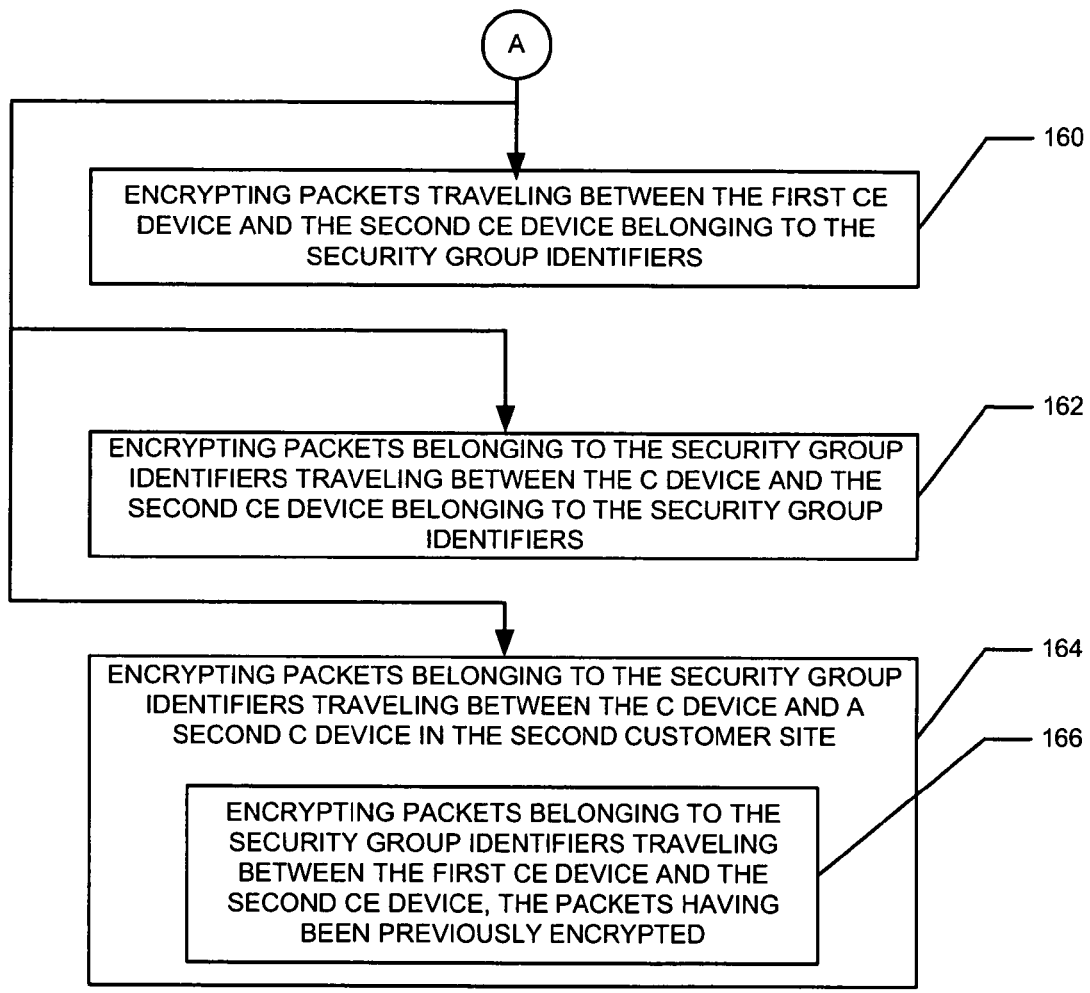

Referring now to FIG. 3A, a particular embodiment of a method 150 of providing IGP routing protocol support for distributing encryption information is shown. The method 150 begins at processing block 152 wherein a message indicating subnet prefixes within the first customer site that are to be encrypted and security group identifiers indicating security groups within said first customer site are received at a second CE device located in a second customer site from a first Customer Edge (CE) device in a first customer site. The message traverses a service provider network between the first CE device and the second CE device.

In processing block 154, the subnet prefixes and the security group identifiers are advertised to other devices in the second customer site. As shown in processing block 156, the receiving is done using a first routing mechanism and the advertising is done using a second routing mechanism, wherein the second routing mechanism is different than the first routing mechanism. As recited in processing block 158, the advertising includes converting the message from a message associated with the first routing mechanism to an advertisement associated with the second routing mechanism.

Referring now to processing block 160, the packets traveling between the first CE device and the second CE device which belong to the security group identifiers are encrypted.

Alternately, as shown in processing block 162, the packets traveling between the C device and the second CE device which belong to the security group identifiers are encrypted.

In another alternate method, in processing block 164, the packets traveling between the first C device and the second C device which belong to the security group identifiers are encrypted. This may include, as shown in processing block 166, encrypting packets which have already been encrypted. The packets from the first C device are encrypted before being transported to the first CE device. The first CE device then encrypts the previously encrypted packets (double encryption) before sending the doubly encrypted packets across the Customer Provider network. The doubly encrypted packets are received at the second CE and are unencrypted once, resulting in single encrypted packets. The single encrypted packets are forwarded to the second C device, where the packets are then unencrypted before being forwarded to the appropriate customer device.

Figure 4:
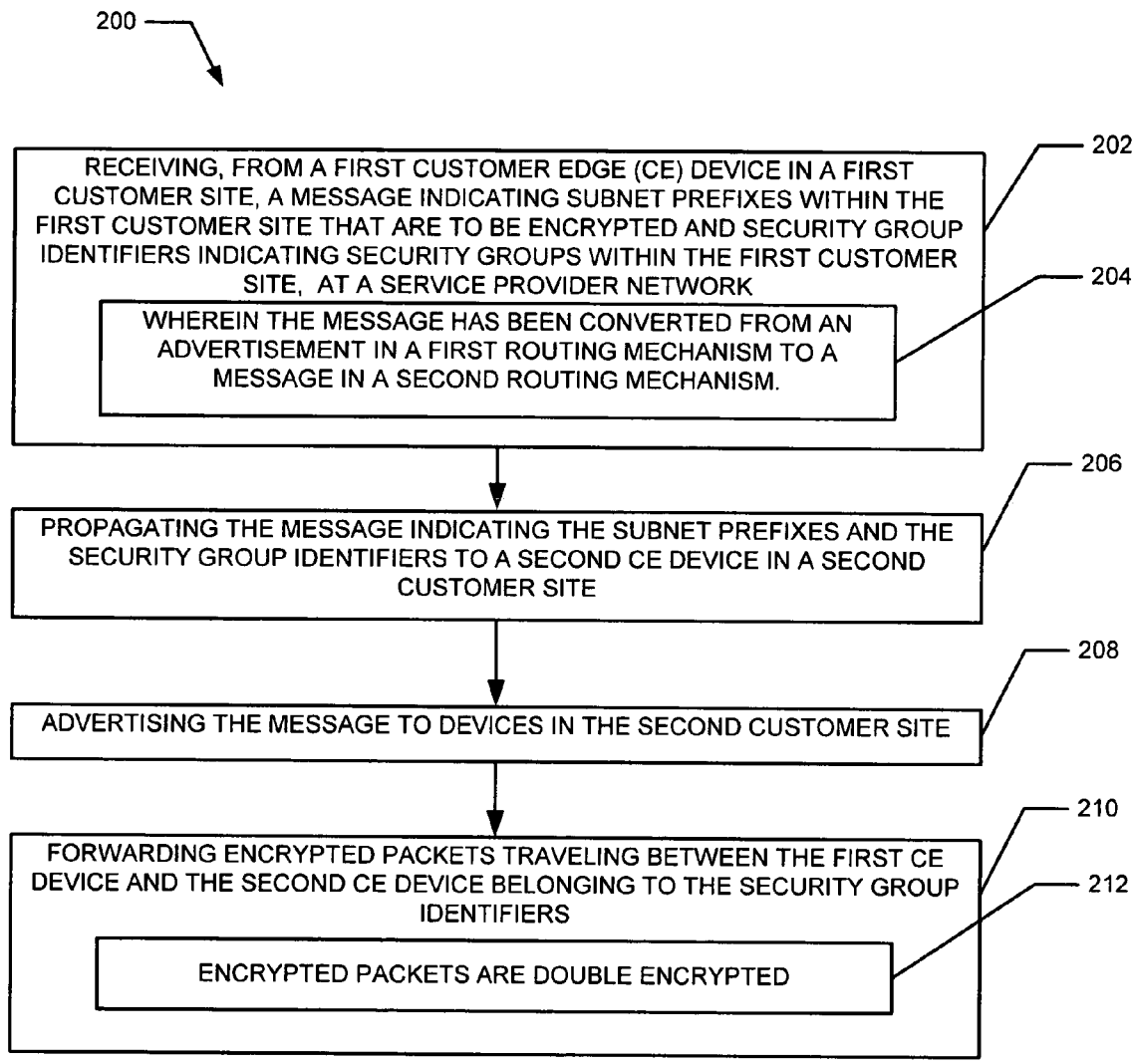
FIG. 4 is a flow diagram for another embodiment of a method of providing IGP routing protocol support for distributing encryption information.

Referring now to FIG. 4, another particular embodiment of a method 200 of providing IGP routing protocol support for distributing encryption information is shown. This method 200 begins with processing block 200 wherein a message received from a first Customer Edge (CE) device in a first customer site at a service provider network. The message indicates subnet prefixes within the first customer site that are to be encrypted and security group identifiers indicating security groups within the first customer site. As shown in processing block 204, the message has been converted from an advertisement in a first routing mechanism to a message in a second routing mechanism.

In processing block 206, the message indicating the subnet prefixes and the security group identifiers are propagated to a second CE device in a second customer site. As recited in processing block 208, the message is advertised to devices in the second customer site.

As shown in processing block 210 encrypted packets traveling between said first CE device and said second CE device which belonging to the security group identifiers are forwarded across the service provider network. As recited in processing block 212, certain ones of the packets may be doubly encrypted.

Figure 5:
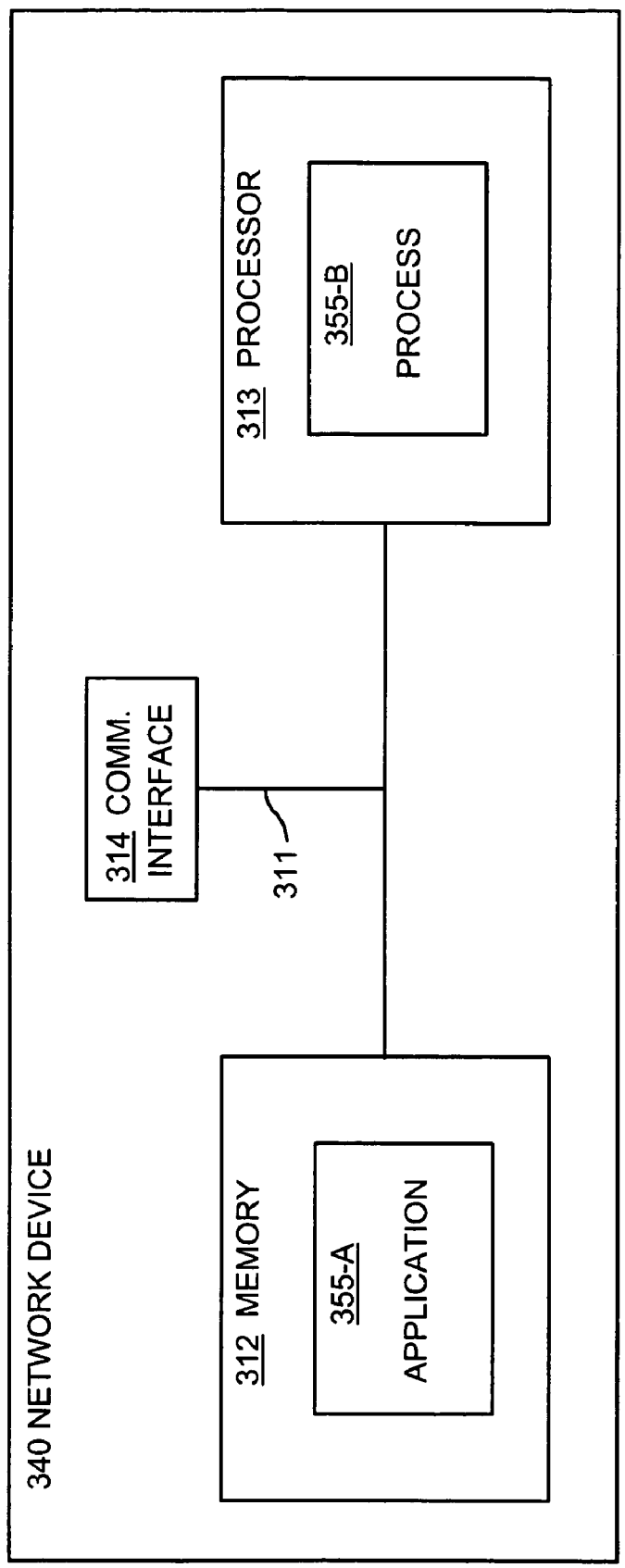
FIG. 5 illustrates an example computer system architecture that performs IGP routing protocol support for distributing encryption information in accordance with embodiments of the invention.

Referring now to FIG. 5, an example computer system architecture that performs IGP routing protocol support for distributing encryption information in accordance with embodiments of the invention is shown. In this example, the architecture includes an interconnection mechanism 311 that couples a memory system 312, a processor 313, and a communications interface 314. The communications interface 314 allows the network device 340 to communicate with external devices or systems.

The memory system 312 may be any type of computer readable medium that is encoded with an application 355-A that represents software code such as data and/or logic instructions (e.g., stored in the memory or on another computer readable medium such as a disk) that embody the processing functionality of embodiments of the invention as explained above. The processor 313 can access the memory system 312 via the interconnection mechanism 311 in order to launch, run, execute, interpret or otherwise perform the logic instructions of the applications 355-A for the network device in order to produce a corresponding process 355-B. In other words, the process 355-B represents one or more portions of the application 355-A performing within or upon the processor 313 in the network device. It is to be understood that the device operates as explained in former examples are represented in FIG. 5 by the application 355-A and/or the process 355-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 312 (e.g., within random access memory or RAM). It is also to be understood that other embodiments of the invention can provide the applications operating within the processor 313 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing IGP routing protocol support for distributing encryption information comprising:

identifying subnet prefixes reachable on a first customer site;

identifying, with security group identifiers, security groups the subnet prefixes belong to;

receiving, at a first Customer Edge (CE) device in said first customer site, an advertisement from a Customer (C)

device in said first customer site indicating links, said subnets to be encrypted, and said security group identifiers; and propagating said prefixes and said security group identifiers across a service provider network to a second CE device located in a second customer site.

2. The method of claim 1 wherein said receiving an advertisement from a C device in said first customer site is done using a first routing mechanism and wherein said propagating said prefixes and said security group identifiers across a service provider network is done using a second routing mechanism, said second routing mechanism different than said first routing mechanism.

3. The method of claim 2 wherein said propagating includes converting said advertisement from an advertisement associated with said first routing mechanism to an advertisement associated with said second routing mechanism.

4. The method of claim 3 further comprising encrypting packets traveling between said first CE device and said second CE device belonging to said security group identifiers.

5. The method of claim 3 further comprising encrypting packets belonging to said security group identifiers traveling between said C device and said second CE device belonging to said security group identifiers.

6. The method of claim 3 further comprising encrypting packets belonging to said security group identifiers traveling between said C device and a second C device in said second customer site.

7. The method of claim 6 further comprising encrypting packets belonging to said security group identifiers traveling between said first CE device and said second CE device and wherein said packets have been previously encrypted.

8. A method of providing IGP routing protocol support for distributing encryption information comprising:

receiving, from a first Customer Edge (CE) device in a first customer site, a message indicating subnet prefixes within said first customer site that are to be encrypted and security group identifiers indicating security groups within said first customer site, at a second CE device located in a second customer site, said message traversing a service provider network between said first CE device and said second CE device; and advertising said subnet prefixes and said security group identifiers to other devices in said second customer site.

9. The method of claim 8 wherein said receiving is done using a first routing mechanism and wherein said advertising is done using a second routing mechanism, said second routing mechanism different than said first routing mechanism.

10. The method of claim 9 wherein said advertising includes converting said message from a message associated with said first routing mechanism to an advertisement associated with said second routing mechanism.

11. The method of claim 10 further comprising encrypting packets traveling between said first CE device and said second CE device belonging to said security group identifiers.

12. The method of claim 10 further comprising encrypting packets belonging to said security group identifiers traveling between said devices in said second customer site and said second CE device belonging to said security group identifiers.

13. The method of claim 10 further comprising encrypting packets belonging to said security group identifiers traveling between said device in said second customer site and a C device in said first customer site.

14. The method of claim 13 further comprising encrypting packets belonging to said security group identifiers traveling between said second CE device and said first CE device, wherein said packets have been previously encrypted.

15. A method of providing IGP routing protocol support for distributing encryption information comprising:

receiving, from a first Customer Edge (CE) device in a first customer site, a message indicating subnet prefixes within said first customer site that are to be encrypted and security group identifiers indicating security groups within said first customer site, at a service provider network; and propagating said message indicating said subnet prefixes and said security group identifiers to a second CE device in a second customer site.

16. The method of claim 15 further comprising advertising said message to devices in said second customer site.

17. The method of claim 15 wherein said receiving a message further comprises receiving a message wherein the message has been converted from an advertisement in a first routing mechanism to a message in a second routing mechanism.

18. The method of claim 16 further comprising forwarding encrypted packets traveling between said first CE device and said second CE device belonging to said security group identifiers.

19. The method of claim 18 wherein said encrypted packets are double encrypted.

20. A system providing IGP routing protocol support for distributing encryption information comprising:

means for identifying subnet prefixes reachable on a first customer site in an encrypted manner;

means for identifying security groups the subnet prefixes belong to with security group identifiers;

means for receiving, at a first Customer Edge (CE) device in said first customer site, an advertisement from a Customer (C) device in said first customer site indicating links, said subnets to be encrypted, and said security group identifiers, said advertisement performed using a first routing mechanism;

means for propagating said prefixes and said security group identifiers across a service provider network to a second CE device located in a second customer site, said means for propagating including means for converting said advertisement to a message associated with a second routing mechanism; and means for advertising said subnet prefixes and said security group identifiers to other devices in said second customer site, said means for advertising including means for converting said message associated with a second message to an advertisement associated with first routing mechanism.

21. The method of claim 1 further comprising adding a first layer of encryption to packets belonging to said security group identifiers at said C device, wherein said first layer of encryption remains in place as said packets travel sequentially through said first CE device, said second CE device, and a second C device in said second customer site; and adding a second layer of encryption on top of said first layer of encryption to said packets belonging to said security group identifiers at said first CE device; and removing said second layer of encryption to packets belonging to said security group identifiers at said second CE device.

22. The method of claim 8 further comprising adding a first layer of encryption to packets belonging to said security group identifiers at said C device, wherein said first layer of encryption remains in place as said packets travel sequentially through said first CE device, said second CE device, and a second C device in said second customer site; and adding a second layer of encryption on top of said first layer of encryption to said packets belonging to said security group identifiers at said first CE device; and removing said second layer of encryption to packets belonging to said security group identifiers at said second CE device.

23. The method of claim 15 further comprising adding a first layer of encryption to packets belonging to said security group identifiers at said C device, wherein said first layer of encryption remains in place as said packets travel sequentially through said first CE device, said second CE device, and a second C device in said second customer site; and adding a second layer of encryption on top of said first layer of encryption to said packets belonging to said security group identifiers at said first CE device; and removing said second layer of encryption to packets belonging to said security group identifiers at said second CE device.

24. The method of claim 1:

wherein the first CE device and the second CE device are devices operable to control access to a respective particular subnet that is identified with a respective particular subnet prefix of the subnet prefixes, the access being controlled to require encryption of packets that are sent to a subrange of the respective particular subnet which is identified by the respective particular subnet prefix; and wherein the packets required to be encrypted are encrypted with a group key that corresponds to a particular security group identifier, the particular security group identifier identifying parameters for encryption to be used when sending the packets to the subrange of the respective particular subnet.

25. The method of claim 1:

wherein the advertisement is a link state advertisement including an advertising router identification and at least one Type Length Value (TLV);

wherein the at least one TLV includes a tunnel endpoint address, a tunnel identification, a tunnel-group identification, and at least one sub-TLV; and wherein the at least one sub-TLV includes one of a security gateway identifier and an IPSec group identity.

\* \* \* \* \*

UNITED STATES PATENT AND TRADEMARK OFFICE
CERTIFICATE OF CORRECTION

PATENT NO. : 7,620,975 B2  Page 1 of 1
APPLICATION NO. : 11/059736
DATED : November 17, 2009
INVENTOR(S) : Guichard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1310 days.

Signed and Sealed this

Fourteenth Day of December, 2010

David J. Kappos
*Director of the United States Patent and Trademark Office*